(12) United States Patent
Aikawa et al.

(10) Patent No.: US 8,029,256 B2
(45) Date of Patent: Oct. 4, 2011

(54) LATERALLY INDEPENDENTLY OPERATED COLUMN-EQUIPPED VULCANIZER

(75) Inventors: Katsuhide Aikawa, Hiroshima (JP); Hideki Fukuda, Hiroshima (JP); Hideaki Katayama, Hiroshima (JP)

(73) Assignee: Mitsubishi Heavy Industries, Ltd (JP)

( * ) Notice: Subject to any disclaimer, the term of this patent is extended or adjusted under 35 U.S.C. 154(b) by 0 days.

(21) Appl. No.: 12/514,346

(22) PCT Filed: Sep. 16, 2008

(86) PCT No.: PCT/JP2008/066668
§ 371 (c)(1),
(2), (4) Date: Jul. 10, 2009

(87) PCT Pub. No.: WO2010/032286
PCT Pub. Date: Mar. 25, 2010

(65) Prior Publication Data
US 2010/0247695 A1      Sep. 30, 2010

(51) Int. Cl.
*B29C 35/02*  (2006.01)
(52) U.S. Cl. ......................... 425/34.1; 425/38
(58) Field of Classification Search .................. 425/34.1, 425/38
See application file for complete search history.

(56) References Cited

U.S. PATENT DOCUMENTS

| | | | | |
|---|---|---|---|---|
| 5,492,464 A | * | 2/1996 | Irie | 425/34.1 |
| 5,683,726 A | * | 11/1997 | Mitamura et al. | 425/34.1 |
| 5,830,513 A | * | 11/1998 | Fukuda | 425/38 |
| 6,582,212 B1 | * | 6/2003 | Mitamura | 425/34.1 |
| 6,908,584 B2 | | 6/2005 | Cole | |
| 2004/0032057 A1 | | 2/2004 | Cole | |
| 2005/0136145 A1 | | 6/2005 | Cole | |
| 2006/0131786 A1 | | 6/2006 | Cole | |
| 2006/0267248 A1 | | 11/2006 | Cole | |

FOREIGN PATENT DOCUMENTS

| JP | 200179849 A | 3/2001 |
|---|---|---|
| JP | 2005535477 A | 11/2005 |
| JP | 2008221554 A | 9/2008 |

OTHER PUBLICATIONS

Catalogue of Rogers Industrial Products Inc, 2 pages.
Catalogue of ThyssenKrupp Elastornertechnik, 10 pages.
International Search Report, dated Dec. 16, 2008.

* cited by examiner

*Primary Examiner* — James Mackey
(74) *Attorney, Agent, or Firm* — Kanesaka Berner and Partners, LLP

(57) ABSTRACT

A laterally independently operated column-equipped vulcanizer comprises two (right and left) die opening and closing devices (12A, 12B) disposed to be operable independently of each other, the die opening and closing devices having upper die mounting members (17a, 17b) corresponding to lower die mounting members (13a, 13b) installed on a base plate (11), the upper die mounting members being supported in an ascendable and descendable manner on right and left paired columns (18a, 18b) erected on the base plate. The right and left paired columns throughout the two die opening and closing devices are arranged in V-configuration as viewed in plan. Loaders (22a, 22b) capable of carrying green tires GT into the die opening and closing devices are disposed on the side of the columns narrowly spaced from each other in the lateral direction among the columns arranged in V-configuration. Unloaders (23a, 23b) capable of carrying vulcanized tires T out of the die opening and closing devices are disposed on the side of the columns widely spaced from each other in the lateral direction among the columns arranged in V-configuration. Thus, the entire vulcanizer can be rendered even more compact.

6 Claims, 4 Drawing Sheets

LATERALLY INDEPENDENTLY OPERATED COLUMN-EQUIPPED VULCANIZER

CROSS-REFERENCE TO RELATED APPLICATIONS

The present application is based on and claims the benefit of priority from International Application No. PCT/JP2008/066668 filed on Sep. 16, 2008. The entire content of the prior application is hereby incorporated by reference herein in its entirety.

TECHNICAL FIELD

This invention relates to a vulcanizer for a pneumatic tire mounted on an automobile or the like. More particularly, the invention relates to a laterally independently operated column-equipped vulcanizer.

BACKGROUND ART

Generally, a laterally independently operated column-equipped vulcanizer is well known in which an upper die mounting member corresponding to a lower die mounting member installed on a base plate is supported in an ascendable and descendable manner on right and left paired columns erected on the base plate to construct a die opening and closing device, and two (right and left) of these die opening and closing devices are disposed to be operable independently of each other.

With this laterally independently operated column-equipped vulcanizer, however, it is general for the right and left paired columns of these respective die opening and closing devices to be arranged laterally in a straight line or in parallel throughout the two (right and left) die opening and closing devices. Thus, the vulcanizer has posed the disadvantage of taking up a wide installation space in the lateral or right-and-left direction.

Hence, it has been difficult, for example, to replace a vulcanizer for a small tire by a vulcanizer for a large tire, which has been increasingly needed in recent years, within the same installation space.

So far, Patent Document 1 has disclosed a vulcanizer comprising two (right and left) tire vulcanizers having right and left paired columns arranged in V-configuration (hereinafter referred to as a V-arranged column-equipped vulcanizer) for compactness of the vulcanizer.

Patent Document 1: U.S. Pat. No. 6,908,584 B2 (FIG. 1, FIG. 5)

DISCLOSURE OF THE INVENTION

Problems to be Solved by the Invention

However, the tire vulcanizer disclosed in Patent Document 1 has not considered the installation position, as the most compact space, of a loader for carrying a green tire into each die opening and closing device, or an unloader for carrying the vulcanized tire out of each die opening and closing device. Thus, the problem has arisen that a truly compact tire vulcanizer has not been realized.

That is, in Patent Document 1, as seen from FIG. 5 as well, a sliding unloader is disposed behind the V-arranged column-equipped vulcanizer (on the side of the columns narrowly spaced from each other in the lateral direction among the columns arranged in V-configuration) to be extended greatly rearward.

The present invention has been accomplished in the light of the above-described situations. It is an object of the invention to provide a laterally independently operated column-equipped vulcanizer which achieves an even more compact configuration of the entire vulcanizer.

Means for Solving the Problems

The laterally independently operated column-equipped vulcanizer according to the present invention, designed to attain the above object, is a laterally independently operated column-equipped vulcanizer comprising two, i.e., right and left, die opening and closing devices disposed to be operable independently of each other, each of the die opening and closing devices having an upper die mounting member corresponding to a lower die mounting member installed on a base plate, the upper die mounting member being supported in an ascendable and descendable manner on right and left paired columns erected on the base plate, characterized in that the right and left paired columns throughout the two die opening and closing devices are arranged in V-configuration as viewed in plan, loaders capable of carrying green tires into the die opening and closing devices are disposed on a side of the columns narrowly spaced from each other in a lateral direction among the columns arranged in V-configuration, and unloaders capable of carrying vulcanized tires out of the die opening and closing devices are disposed on a side of the columns widely spaced from each other in the lateral direction among the columns arranged in V-configuration.

The laterally independently operated column-equipped vulcanizer is characterized in that locking devices engaging the right and left paired columns during die clamping to lock the upper die mounting member to the right and left paired columns are provided on the upper die mounting member of each of the die opening and closing devices.

The laterally independently operated column-equipped vulcanizer is also characterized in that the loaders and the unloaders are installed on the base plate to be ascendable and descendable and pivotable.

Effects of the Invention

According to the present invention, the columns arranged in V-configuration are adopted, and the loaders and the unloaders are effectively arranged. Thus, the entire vulcanizer can be rendered even more compact in the fore-and-aft direction and in the right-and-left or lateral direction.

DESCRIPTION OF THE NUMERALS AND SYMBOLS

Figure 1:
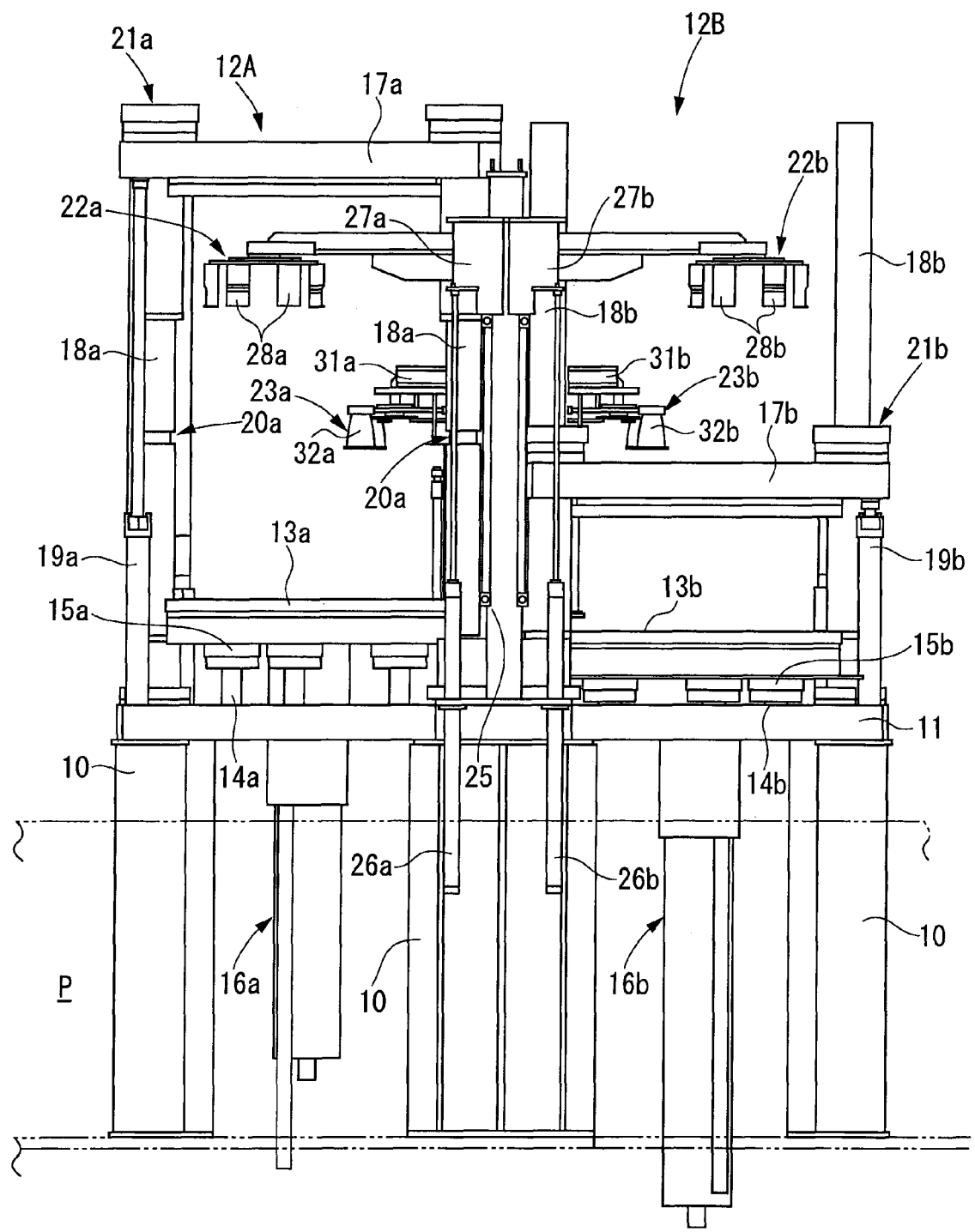
FIG. 1 is a front view of a laterally independently operated column-equipped vulcanizer showing an embodiment of the present invention.

10 Strut
11 Base plate

12A Left-hand die opening and closing device
12B Right-hand die opening and closing device
13a, 13b Lower die mounting member
14a, 14b Hoisting screw
15a, 15b Pressing cylinder
17a, 17b Upper die mounting member
18a, 18b Column
19a, 19b Hoisting cylinder
20a, 20b Constricted portion
21a, 21b Locking device
22a, 22b Loader
23a, 23b Unloader
24a, 24b Conveyor
25 Linear guide
26a, 26b Cylinder
27a, 27b Ascending and descending body
28a, 28b Gripper member
29 Linear guide
30a, 30b Cylinder
31a, 31b Ascending and descending body
32a, 32b Gripper member
P Pit
GT Green tire
T Vulcanized tire

BEST MODE FOR CARRYING OUT THE INVENTION

Hereinbelow, a laterally independently operated column-equipped vulcanizer according to the present invention will be described in detail by an embodiment with reference to the accompanying drawings.

Embodiment

Figure 2:
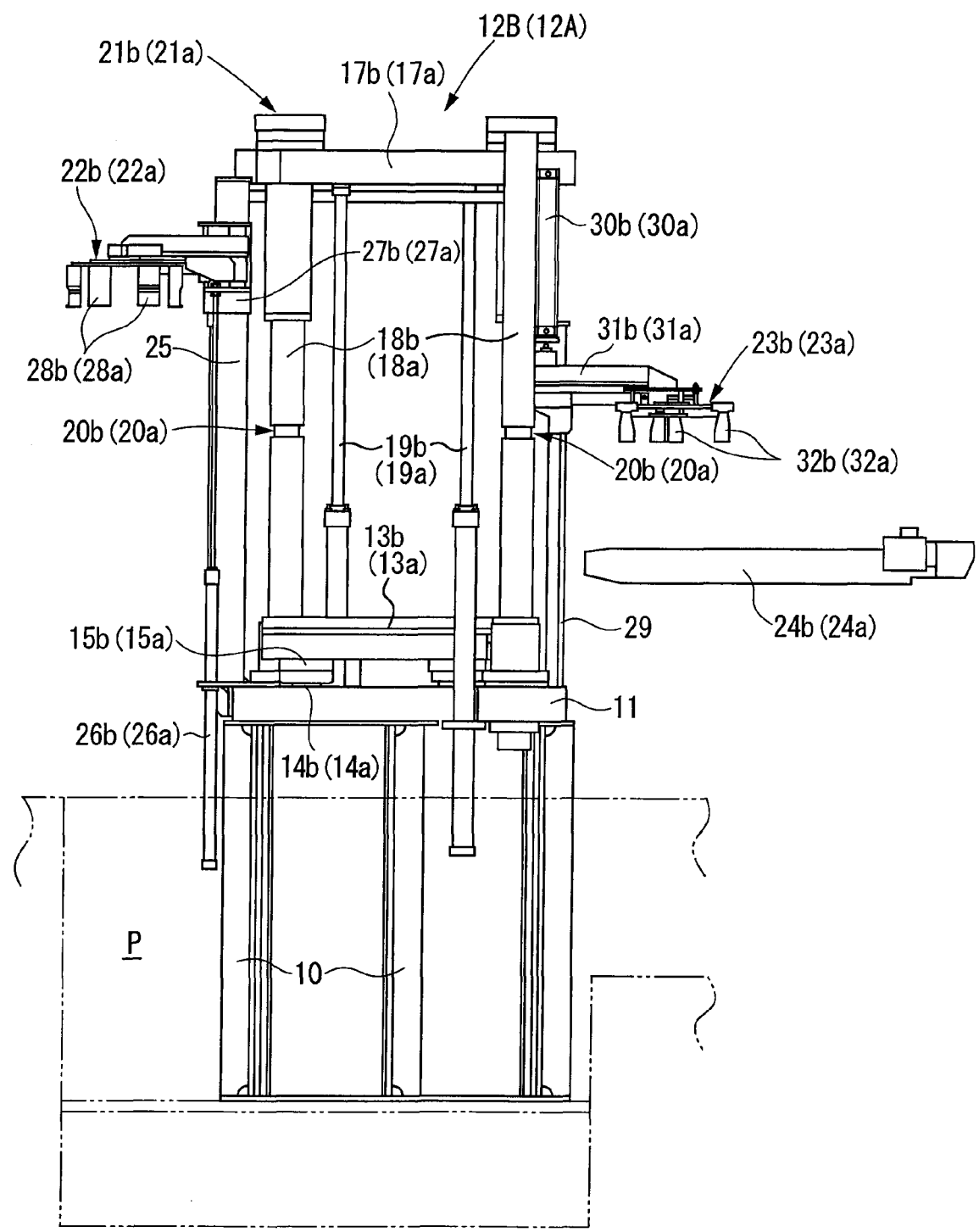
FIG. 2 is a side view of the laterally independently operated column-equipped vulcanizer when an upper die mounting member ascends.
Figure 3:
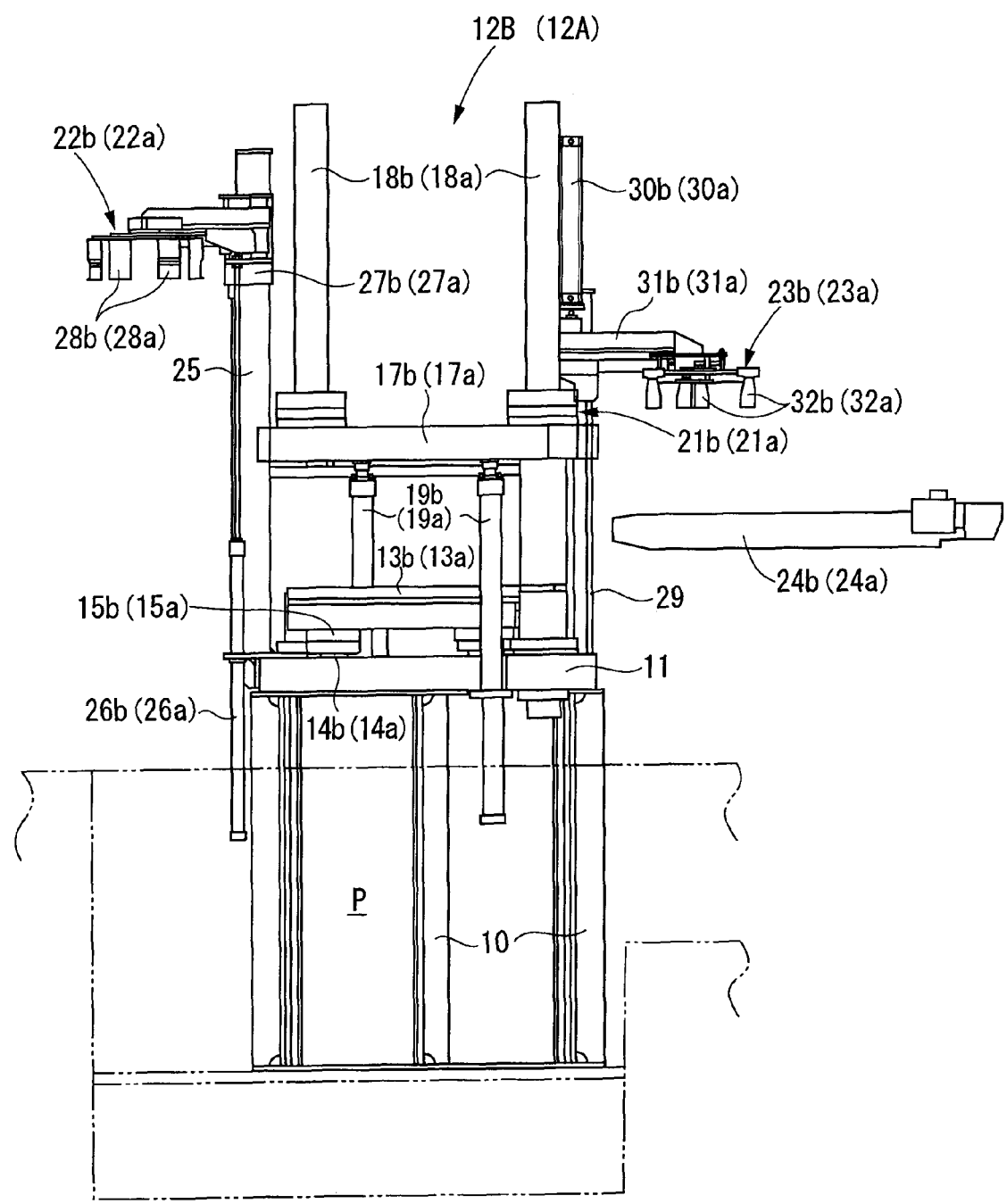
FIG. 3 is a side view of the laterally independently operated column-equipped vulcanizer when the upper die mounting member descends.
Figure 4:
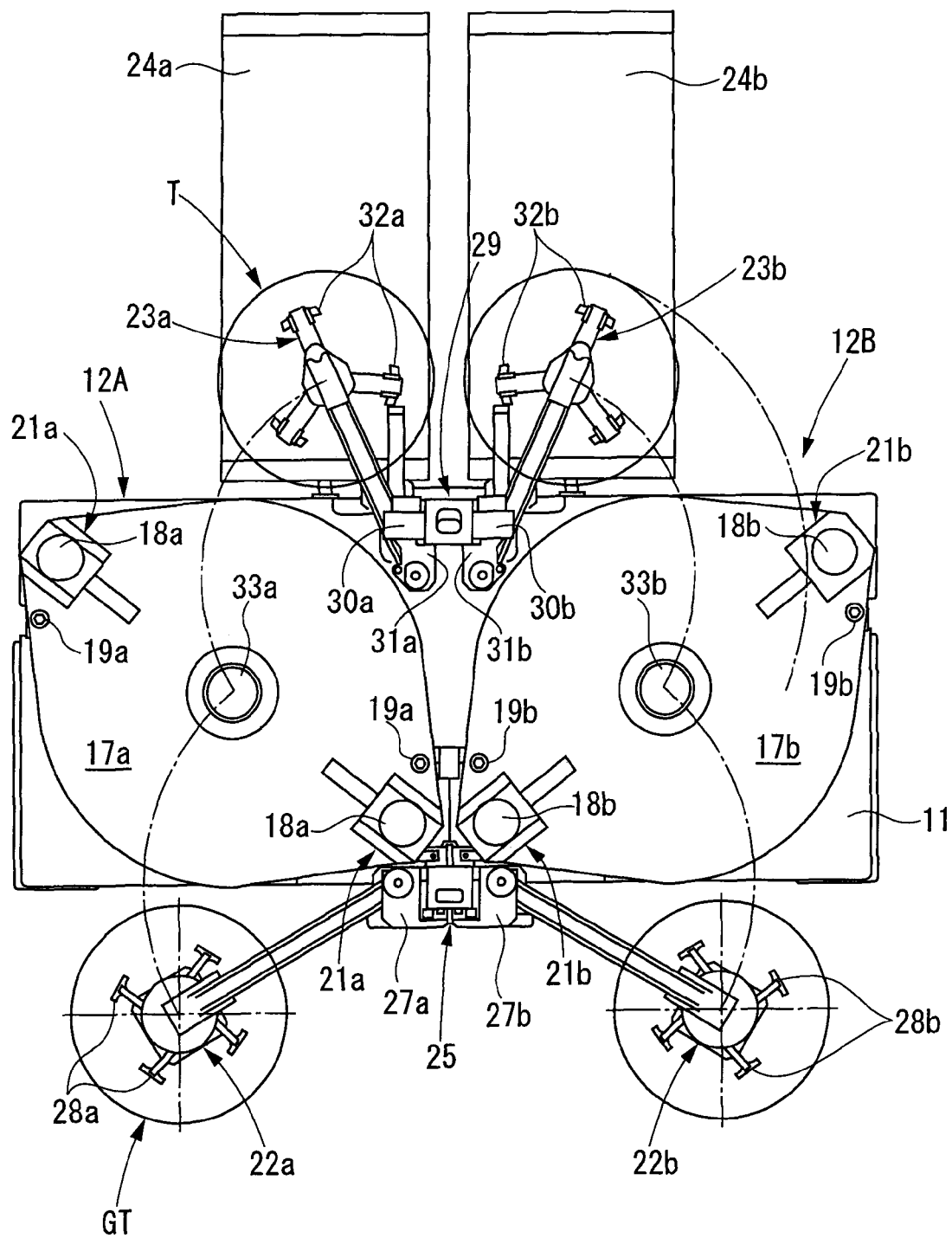
FIG. 4 is a plan view of the laterally independently operated column-equipped vulcanizer.

FIG. 1 is a front view of a laterally independently operated column-equipped vulcanizer showing an embodiment of the present invention. FIG. 2 is a side view of the laterally independently operated column-equipped vulcanizer when an upper die mounting member ascends. FIG. 3 is a side view of the laterally independently operated column-equipped vulcanizer when the upper die mounting member descends. FIG. 4 is a plan view of the laterally independently operated column-equipped vulcanizer.

As illustrated, a base plate 11 is supported horizontally by a plurality of struts 10 erected within a pit P of a plant, and a left-hand die opening and closing device 12A and a right-hand die opening and closing device 12B are installed on the base plate 11 to be operable independently of each other.

The left-hand die opening and closing device 12A and the right-hand die opening and closing device 12B have respective lower die mounting members (bottom plates) 13a and 13b supported on the bas plate 11 by a plurality of hoisting screws 14a, 14b and pressing cylinders 15a, 15b connected to upper end parts of the hoisting screws 14a, 14b so as to be capable of ascending and descending (be capable of making height adjustment and performing die clamping (to be described later)).

Central mechanisms 16a, 16b, which operate bladders (not shown) inserted inside tires and used there during tire shaping and vulcanization, are assembled to central parts of the respective lower die mounting members 13a, 13b. The central mechanisms 16a, 16b penetrate the base plate 11 in an ascendable and descendable manner.

In the present embodiment, upper die mounting members (bolster plates) 17a, 17b corresponding to the respective lower die mounting members 13a, 13b are supported in an ascendable and descendable manner by right and left paired columns 18a, 18a and 18b, 18b erected on the base plate 11. In the drawings, the numerals 19a, 19a and 19b, 19b represent right and left paired hoisting cylinders interposed upwardly between the base plate 11 and the upper die mounting members 17a, 17b.

The right and left paired columns 18a, 18a and 18b, 18b are arranged in V-configuration, as viewed in plan, throughout the left-hand die opening and closing device 12A and the right-hand die opening and closing device 12B. That is, the right and left paired columns 18a, 18a are disposed in point symmetry with respect to a die opening and closing cylinder 33a provided downwardly at a central part of the upper die mounting member 17a, while the right and left paired columns 18b, 18b are disposed in point symmetry with respect to a die opening and closing cylinder 33b provided downwardly at a central part of the upper die mounting member 17b. These columns 18a, 18a and 18b, 18b, as a whole, are arranged to fan out when viewed in plan. The hoisting cylinders 19a, 19a are similarly disposed in point symmetry with respect to the die opening and closing cylinder 33a adjacently to the right and left columns 18a, 18a, whereas the hoisting cylinders 19b, 19b are similarly disposed in point symmetry with respect to the die opening and closing cylinder 33b adjacently to the right and left columns 18b, 18b.

Constricted portions (small-diameter portions) 20a, 20a and 20b, 20b are provided in the outer peripheries of intermediate parts of the right and left paired columns 18a, 18a and the right and left paired columns 18b, 18b. Right and left paired locking devices 21a, 21a and right and left paired locking devices 21b, 21b are installed on upper surface parts of the upper die mounting members 17a and 17b, respectively. The locking devices 21a, 21a and 21b, 21b engage the constricted portions 20a, 20a and 20b, 20b, and lock the upper die mounting members 17a and 17b to the right and left paired columns 18a, 18a and 18b, 18b during die clamping to be described later.

In the present embodiment, moreover, left and right paired loaders 22a and 22b, which can carry green tires into the left-hand die opening and closing device 12A and the right-hand die opening and closing device 12B, are disposed on the side where the columns of the columns arranged in V-configuration are narrowly spaced from each other in the lateral direction. On the other hand, left and right paired unloaders 23a and 23b and left and right paired conveyors 24a, 24b, which can carry vulcanized tires out of the left-hand die opening and closing device 12A and the right-hand die opening and closing device 12B, are disposed on the side where the columns of the columns arranged in V-configuration are widely spaced from each other in the lateral direction.

The left and right paired loaders 22a and 22b comprise left and right paired tire carry-in portions equipped with expansible and contractible gripper members 28a and 28b. The left and right paired tire carry-in portions are provided on ascending and descending bodies 27a and 27b so as to be horizontally pivotable independently of each other by actuators (not shown). The ascending and descending bodies 27a and 27b can ascend and descend, independently of each other, under the action of left and right paired cylinders 26a and 26b on a linear guide 25 elected on a front side of a laterally intermediate part of the base plate 11.

The green tires can be clamped and unclamped upon the contraction and expansion of the gripper members 28a and 28b. The left and right paired cylinders 26a and 26b are located upwardly between the base plate 11 and the ascending and descending bodies 27a and 27b.

The left and right paired unloaders 23a and 23b comprise left and right paired tire carry-out portions equipped with expansible and contractible gripper members 32a and 32b. The left and right paired tire carry-out portions are provided on ascending and descending bodies 31a and 31b so as to be horizontally pivotable independently of each other by actuators (not shown). The ascending and descending bodies 31a and 31b can ascend and descend, independently of each other, under the action of left and right paired cylinders 30a and 30b on a linear guide 29 elected on a rear side of the laterally intermediate part of the base plate 11.

The vulcanized tires can be clamped and unclamped upon the contraction and expansion of the gripper members 32a and 32b. The left and right paired cylinders 30a and 30b are located downwardly between an upper end part of the linear guide 29 and the ascending and descending bodies 31a and 31b.

Because of the above-described features, in both of the left-hand die opening and closing device 12A and the right-hand die opening and closing device 12B, tire vulcanization may be performed using dies of the same dimensions, or tire vulcanization may be performed using dies of different dimensions. Moreover, the timing of motions may be the same or different for both of the left-hand die opening and closing device 12A and the right-hand die opening and closing device 12B.

Next, the left-hand die opening and closing device 12A is taken as an example for illustrating its fundamental motions.

First, the cylinder 26 is contracted from the state of the drawing to lower the loader 22a, and a green tire GT (see FIG. 4) in a wait state directly below the loader 22a is clamped. Then, the cylinder 26a is extended to raise the loader 22a.

Then, the loader 22a is pivoted and, when it arrives at a position directly above the lower die mounting member 13a, the cylinder 26a is contracted to lower the loader 22a, and set the green tire GT within a lower die (not shown) located directly below it.

Then, a low internal pressure (a heating and pressurizing medium such as steam) is supplied into the green tire GT by the central mechanism 16a via a bladder (not shown) to carry out shaping of the unvulcanized tire. The loader 22a is raised upon extension of the cylinder 26a, and then pivoted sideways of the base plate 11 for retreat.

After the loader 22a retreats, the hoisting cylinders 19a are contracted from the illustrated state to lower the upper die mounting member 17a, and set an upper die (not shown) on the lower die (not shown) located directly below it (perform so-called die closing).

Then, the right and left paired locking devices 21a, 21a are actuated to lock the upper die mounting member 17a on the right and left paired columns 18a, 18a. In this state, the pressing cylinders 15a below the lower die mounting member 13a are extended to perform die clamping of the upper die and the lower die (not shown).

In this state, a high internal pressure (a heating and pressurizing medium such as steam) is supplied into the green tire GT by the central mechanism 16a via the bladder (not shown) to carry out tire vulcanization over the course of a predetermined time (of the order of 10 to 15 minutes).

Upon completion of this tire vulcanization, the right and left paired locking devices 21a, 21a are released, and the hoisting cylinders 19a, 19a are extended to raise the upper die mounting member 17a (perform so-called die opening).

Then, the unloader 23a is pivoted and, when it arrives at a position directly above the lower die mounting member 13a, the cylinder 30a is extended to lower the unloader 23a, which clamps the vulcanized tire T (see FIG. 4) within the lower die (not shown) located directly below it.

Then, the cylinder 30a is contracted to raise the unloader 23a, whereafter the unloader 23a is pivoted through a predetermined angle. Then, the vulcanized tire T is unclamped, put on the conveyor 24a located directly below the unloader 23a, and carried outward thereby. Afterwards, this procedure is repeated.

According to the present embodiment, in the laterally independently operated column-equipped vulcanizer, the pair of columns 18a, 18a of the left-hand die opening and closing device 12A and the pair of columns 18b, 18b of the right-hand die opening and closing device 12B are arranged in V-configuration as viewed in plan. Thus, dimensional cuts in the width direction of the vulcanizer can be achieved.

In addition, the loaders 22a and 22b are disposed on the side of the columns 18a and 18b narrowly spaced from each other in the lateral direction among the columns arranged in V-configuration. On the other hand, the unloaders 23a, 23b are disposed on the side of the columns 18a and 18b widely spaced from each other in the lateral direction among the columns arranged in V-configuration. Thus, the wide space on the side of the laterally widely spaced columns 18a and 18b can be effectively used so that the linear guide 29 and the ascending and descending bodies 31a, 31b for the left and right paired unloaders 23a and 23b can be disposed as inwardly of the base plate 11 as possible. Furthermore, the left and right paired conveyors 24a and 24b can be disposed as close to the base plate 11 as possible. Thus, dimensional cuts in the fore-and-aft direction of the vulcanizer can be achieved.

As a result, according to the present embodiment, the entire vulcanizer can become even more compact, and the installation space within the plant can be reduced. In other words, even in a limited installation space within the plant, the conventional vulcanizer for a small tire can be replaced by a vulcanizer for a large tire.

Moreover, according to the present embodiment, on the side of the left and right paired loaders 22a and 22b, the spacing between the pair of columns 18a, 18a or between the pair of columns 18b, 18b can be used fully effectively to replace the upper die and the lower die. This presents the advantage that the replacement work can be done easily.

Furthermore, according to the present embodiment, the left and right paired upper die mounting members 17a and 17b can be locked to the right and left columns 18a, 18a and 18b, 18b by the right and left locking devices 21a, 21a and 21b, 21b provided on the upper die mounting members 17a and 17b. Thus, die clamping can be performed merely by extending the cylinders 15a, without using tie rods, etc. Also, the right and left paired columns 18a, 18a and 18b, 18b can be locked for firmness, achieving simplification of the apparatus and ensuring its reliability.

Besides, according to the present embodiment, the left and right paired loaders 22a and 22b and unloaders 23a and 23b are installed on the base plate 11 to be ascendable and descendable and pivotable. This brings the advantages that further compactness of the entire vulcanizer can be promoted, and the cost is lower than that of the sliding type or the like.

It goes without saying that the present invention is not limited to the foregoing embodiment, and various changes and modifications may be made without departing from the gist of the present invention.

INDUSTRIAL APPLICABILITY

The laterally independently operated column-equipped vulcanizer according to the present invention is preferred for use as a vulcanizer for a large tire, for which a demand has increased particularly in recent years for automobiles, etc.

The invention claimed is:

1. A laterally independently operated column-equipped vulcanizer comprising:
   a base plate;
   right and left, die opening and closing devices operable independently of each other, each of the die opening and closing devices having (i) an upper die mounting member corresponding to a lower die mounting member installed on the base plate, (ii) right and left paired columns erected on the base plate, wherein
   the upper die mounting members are supported in an ascendable and descendable manner on the right and left paired columns and
   the right and left paired columns throughout the two die opening and closing devices are arranged in a V-configuration as viewed in plan,
   a linear guide erected on the base plate,
   loaders for carrying green tires into the die opening and closing devices, said loaders being disposed on a side of the columns which are corresponding to the loaders, and said columns corresponding to the loaders being spaced from each other in a lateral direction among the columns arranged in the V-configuration, and
   unloaders for carrying vulcanized tires out of the die opening and closing devices, said unloaders being disposed on another side of the columns which are corresponding to the unloaders, and said columns corresponding to the unloaders being more widely spaced from each other in the lateral direction among the columns arranged in the V-configuration than the columns corresponding to the loaders.

2. The laterally independently operated column-equipped vulcanizer according to claim 1, further comprising locking devices provided on the upper die mounting member of each of the die opening and closing devices for engaging the right and left paired columns during die clamping and for locking the upper die mounting member to the right and left paired columns.

3. The laterally independently operated column-equipped vulcanizer according to claim 1, wherein the loaders and the unloaders are installed on the base plate to be ascendable and descendable and pivotable.

4. The laterally independently operated column-equipped vulcanizer according to claim 2, wherein the loaders and the unloaders are installed on the base plate to be ascendable and descendable and pivotable.

5. The laterally independently operated column-equipped vulcanizer according to claim 1, further comprising conveyors located below the unloaders for carrying the vulcanized tires and arranged proximately to the base plate,
   wherein
   said unloaders include ascending and descending bodies which are independently movable in an ascendable and descendable manner on the linear guide, and
   the ascending and descending bodies and the linear guide are arranged inwardly of the base plate.

6. The laterally independently operated column-equipped vulcanizer according to claim 1, wherein
   one of said left pair of the columns and one of said right pair of the columns correspond to the unloaders,
   the other one of said left pair of the columns and the other one of said right pair of the columns correspond to the loaders, and
   a distance in the lateral direction between the columns corresponding to the unloaders is greater than that between the columns corresponding to the loaders.

* * * * *